(12) United States Patent
Speller et al.

(10) Patent No.: US 12,208,886 B2
(45) Date of Patent: Jan. 28, 2025

(54) AXIALLY BIASED NONINTEGRAL RACEWAYS FOR ROTORCRAFT MASTS

(71) Applicant: Textron Innovations Inc., Providence, RI (US)

(72) Inventors: Charles Hubert Speller, Flower Mound, TX (US); Alan Wayne Falls, Arlington, TX (US); Nathan D. Sudek, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 185 days.

(21) Appl. No.: 18/080,187

(22) Filed: Dec. 13, 2022

(65) Prior Publication Data

US 2024/0190560 A1  Jun. 13, 2024

(51) Int. Cl.
*B64C 27/12* (2006.01)
*B64C 29/00* (2006.01)
*F16C 35/063* (2006.01)

(52) U.S. Cl.
CPC ............ *B64C 27/12* (2013.01); *F16C 35/063* (2013.01); *B64C 29/0033* (2013.01); *F16C 2223/10* (2013.01); *F16C 2326/43* (2013.01)

(58) Field of Classification Search
CPC ..... B64C 29/0033; B64C 27/14; B64C 27/32; B64C 27/12; B64C 2027/4736; B64C 27/025; B64C 27/48; B64C 27/58; F16C 2326/43; F16C 35/063; F16C 33/586; F16C 19/26; F16C 19/361; F16C 19/364; F16C 19/548; F16C 2226/60; F16C 2326/06; F16C 25/06; F16C 25/083; F16C 33/34; F16C 33/366; F16C 33/467; F16C 35/067; F16C 35/073; F16C 35/12; F16C 19/38;

(Continued)

(56) References Cited

U.S. PATENT DOCUMENTS 3,322,200 A * 5/1967 Tresch .................... B64C 27/32
416/114
3,486,832 A * 12/1969 Carnell ................... B64C 27/14
416/114

(Continued)

FOREIGN PATENT DOCUMENTS

DE      102016221340 A1 * 5/2018 ............. B64C 27/12

OTHER PUBLICATIONS

Machine Translation of DE 102016221340 A1 [retrieved on Sep. 24, 2024]. Retrieved from: Espacenet. (Year: 2024).*

*Primary Examiner* — Eric J Zamora Alvarez
(74) *Attorney, Agent, or Firm* — Lawrence Youst PLLC

(57) ABSTRACT

A propulsion assembly for a rotorcraft. The propulsion assembly includes a mast having an internal ledge, a raceway station and an external ridge with at least a portion of the raceway station positioned axially between the internal ledge and the external ridge. A nonintegral raceway is receivable by the raceway station to form a press fit joint between the mast and the nonintegral raceway. A mast bearing assembly includes a plurality of bearings configured to engage an outer surface of the nonintegral raceway. The internal ledge is configured to generate a nonuniform normal force between the mast and the nonintegral raceway along the raceway station that axially biases the nonintegral raceway toward the external ridge, thereby securing the nonintegral raceway at the raceway station.

20 Claims, 11 Drawing Sheets

(58) Field of Classification Search
CPC ............... F16C 19/546; F16C 2223/10; F16C 2226/16; F16C 33/58; F16C 33/12; F16C 2240/30; F16C 33/583; F16C 33/585; B64D 35/00; B64F 5/10
See application file for complete search history.

(56) References Cited

U.S. PATENT DOCUMENTS

| | | | |
|---|---|---|---|
| 6,152,696 A * | 11/2000 | Rampal | B64C 27/605 |
| | | | 416/114 |
| 7,938,628 B2 | 5/2011 | Lin | |
| 10,017,247 B1 | 7/2018 | Elliott et al. | |
| 10,415,637 B2 * | 9/2019 | Yamauchi | B64C 27/12 |
| 10,960,972 B2 * | 3/2021 | Mueller | B64C 29/0033 |
| 11,041,525 B1 * | 6/2021 | Mueller | F16C 33/583 |
| 2020/0031463 A1 | 1/2020 | Mueller et al. | |

\* cited by examiner

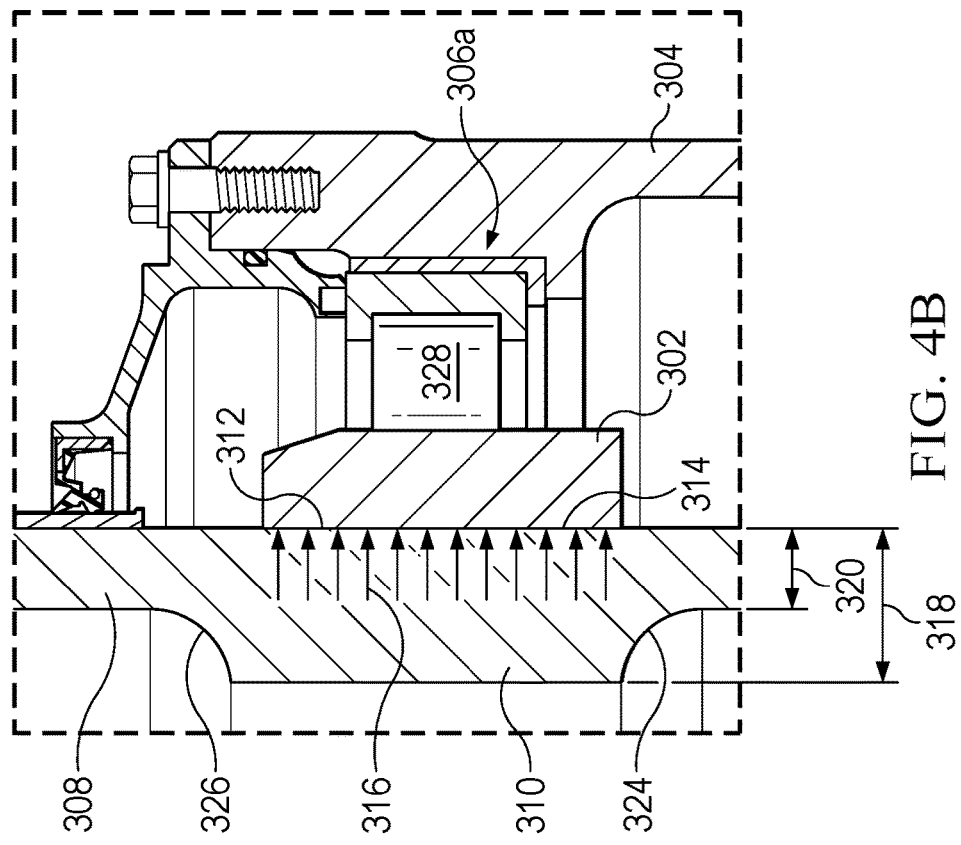
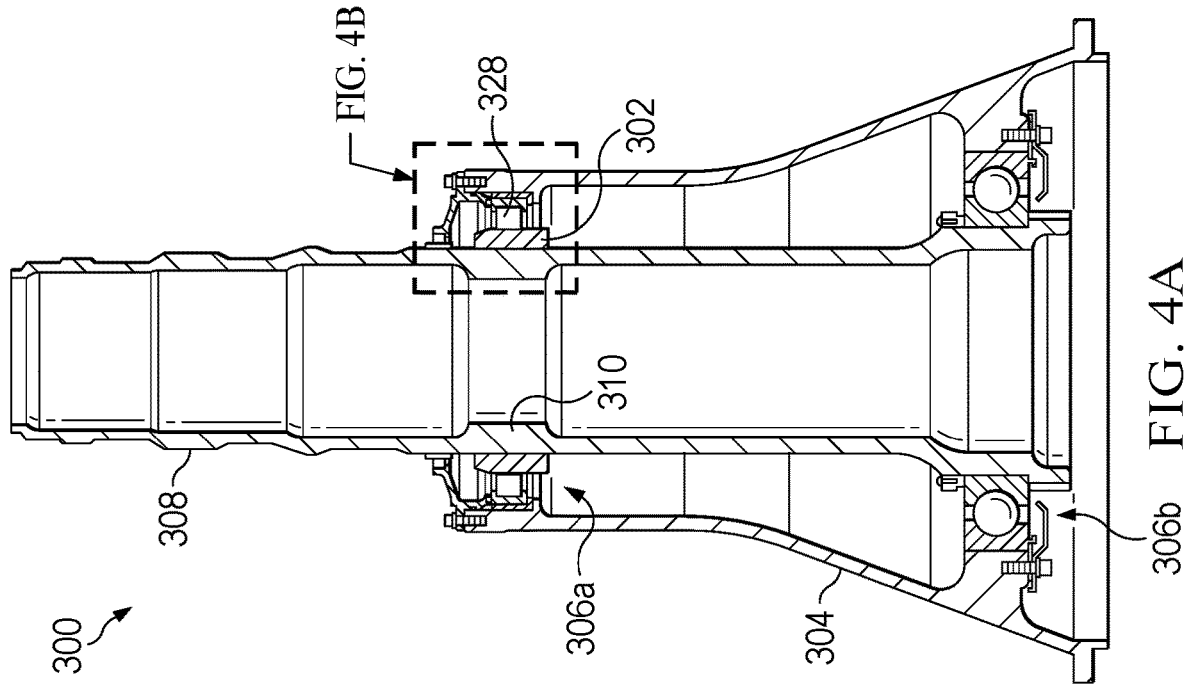

AXIALLY BIASED NONINTEGRAL RACEWAYS FOR ROTORCRAFT MASTS

GOVERNMENT RIGHTS

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

TECHNICAL FIELD OF THE DISCLOSURE

The present disclosure relates, in general, to rotorcraft masts having a nonintegral raceway that is engaged by a mast bearing assembly and, in particular, to a nonintegral raceway having a press fit joint with a rotorcraft mast between an internal ledge and an external ridge such that the nonintegral raceway is axially biased toward the external ridge.

BACKGROUND

Rotorcraft propulsion assemblies include a drive system that transfers torque and rotational energy from a power source, such as an engine, to a rotor. Rotorcraft drive systems include a mast, which typically extends from a transmission and terminates at a rotor hub from which a number of rotor blades radially extend. Because masts carry shear, thrust and other loads during operation, propulsion assemblies often utilize a mast bearing assembly including bearings that engage with the mast to facilitate mast rotation while providing structural support for the mast against these loads. Raceways on the outer surface of the mast provide a surface against which the bearings of the mast bearing assembly engage. Because raceways are required to bear shear, thrust and other loads transmitted via the bearings, raceways are often harder than the remainder of the mast.

Propulsion assemblies that include integral raceways require that the mast be made from a steel alloy that can be case hardened, such as by induction hardened or carburized, to form a hard surface to act as the raceway for the bearings. Such steel alloys, however, tend to corrode in areas such as the hub spline and as a result, may require more frequent replacement. Integral raceways also require the entire mast to be replaced if the raceway is damaged. Nonintegral raceways may be used to overcome some of these drawbacks. Propulsion assemblies utilizing a nonintegral raceway may include a mast formed from a corrosion resistant material, such as a stainless steel, and a raceway formed from a conventional bearing steel alloy capable of high hardness. Current propulsion assemblies with nonintegral raceways have, however, encountered numerous other challenges. For example, in fastening the raceway to the mast, current nonintegral raceways require mast threads, nuts and other fasteners that cause structurally compromising stress concentrations, especially when experiencing induced cyclic loading during flight. Current nonintegral raceways also require more parts, thereby increasing the weight of the propulsion assembly and introducing additional stress points during operation. Accordingly, a need has arisen for nonintegral raceways capable of bearing high loads and preserving the structural integrity of masts while minimizing the weight, number of parts and stress points in the propulsion assembly.

SUMMARY

In a first aspect, the present disclosure is directed to a propulsion assembly for a rotorcraft. The propulsion assembly includes a mast having an internal ledge, a raceway station and an external ridge with at least a portion of the raceway station positioned axially between the internal ledge and the external ridge. A nonintegral raceway is receivable by the raceway station to form a press fit joint between the mast and the nonintegral raceway. A mast bearing assembly includes a plurality of bearings configured to engage an outer surface of the nonintegral raceway. The internal ledge is configured to generate a nonuniform normal force between the mast and the nonintegral raceway along the raceway station that axially biases the nonintegral raceway toward the external ridge, thereby securing the nonintegral raceway at the raceway station.

In some embodiments, the internal ledge may be a circumferential internal ledge, the raceway station may be a circumferential raceway station and/or the external ridge may be a circumferential external ridge. In certain embodiments, the internal ledge may have a maximum wall thickness that is between 1.5 and 3 times a wall thickness of the mast proximate the external ridge such as a maximum wall thickness that is between 1.75 and 2.5 times the wall thickness of the mast proximate the external ridge or a maximum wall thickness that is about 2 times the wall thickness of the mast proximate the external ridge. In some embodiments, the internal ledge may have a proximal profile and a distal profile. In such embodiments, the proximal profile and the distal profile of the internal ledge may be common profiles or may be dissimilar profiles. Also, in such embodiments, the proximal profile and the distal profile of the internal ledge may be arcuate profiles or the proximal profile may be a tapered profile and the distal profile may be an arcuate profile.

In certain embodiments, the external ridge may have a tapered profile having an angle of between 20 degrees and 30 degrees such as an angle of about 25 degrees. In some embodiments, the nonintegral raceway may have a tapered edge the mates with the tapered profile of the external ridge of the mast. In certain embodiments, the nonintegral raceway may be formed from a different material than the mast. For example, the nonintegral raceway may be formed from a M50 alloy steel while the mast may be formed from a stainless steel. In another example, the nonintegral raceway may be formed from a material that is hardened while the mast may be formed from a material that is not hardened. In some embodiments, the nonintegral raceway may be thermally fitted onto the raceway station.

In a second aspect, the present disclosure is directed to a rotorcraft that includes a fuselage and a propulsion assembly that is coupled to the fuselage. The propulsion assembly includes a mast having an internal ledge, a raceway station and an external ridge with at least a portion of the raceway station positioned axially between the internal ledge and the external ridge. A nonintegral raceway is receivable by the raceway station to form a press fit joint between the mast and the nonintegral raceway. A mast bearing assembly includes a plurality of bearings configured to engage an outer surface of the nonintegral raceway. The internal ledge is configured to generate a nonuniform normal force between the mast and the nonintegral raceway along the raceway station that axially biases the nonintegral raceway toward the external ridge, thereby securing the nonintegral raceway at the raceway station.

In a third aspect, the present disclosure is directed to a method of securing a nonintegral raceway to a mast for a rotorcraft. The method includes providing a mast including an internal ledge, a raceway station and an external ridge, at least a portion of the raceway station positioned axially between the internal ledge and the external ridge; providing a nonintegral raceway that is formed from a different material than the mast, the nonintegral raceway having a hardened outer surface; heating the nonintegral raceway; thermally fitting the heated nonintegral raceway onto the mast until the heated nonintegral raceway is received by the raceway station of the mast; allowing the heated nonintegral raceway to cool to form a press fit joint between the nonintegral raceway and the mast; and axially biasing the nonintegral raceway toward the external ridge responsive to a nonuniform normal force between the mast and the nonintegral raceway along the raceway station, thereby securing the nonintegral raceway at the raceway station.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 4A-4B are cross-sectional views of a propulsion assembly utilizing a mast having a nonintegral raceway in accordance with embodiments of the present disclosure;

DETAILED DESCRIPTION

Figure 1A:
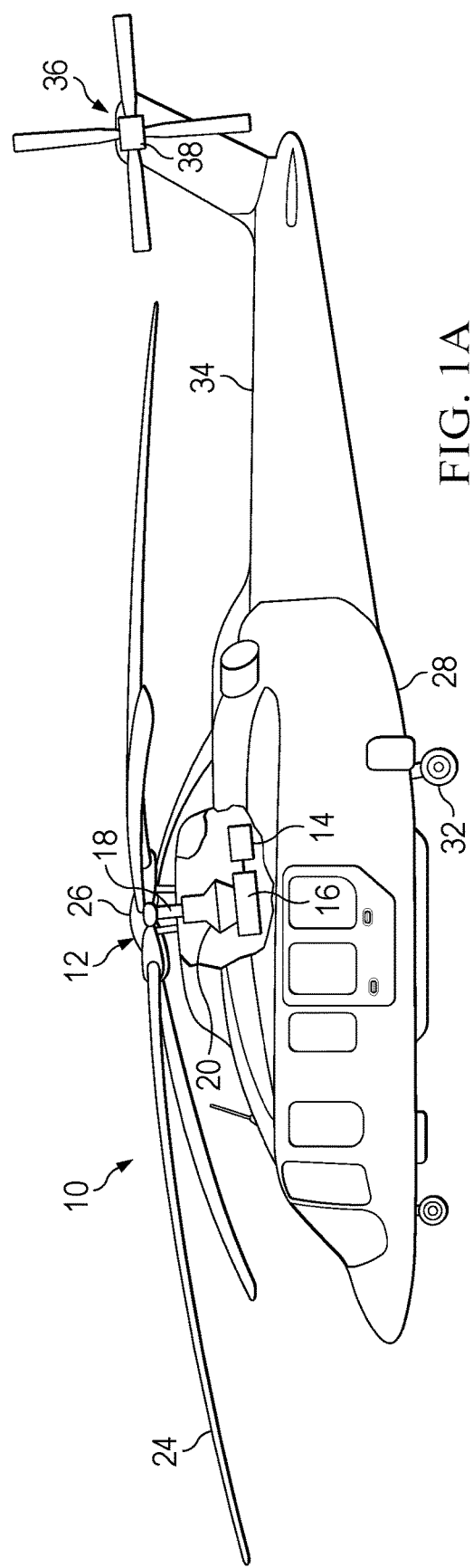
FIGS. 1A-1D are schematic illustrations of a helicopter and components parts thereof having a main rotor assembly utilizing a mast having an axially biased nonintegral raceway in accordance with embodiments of the present disclosure.
Figure 1B:
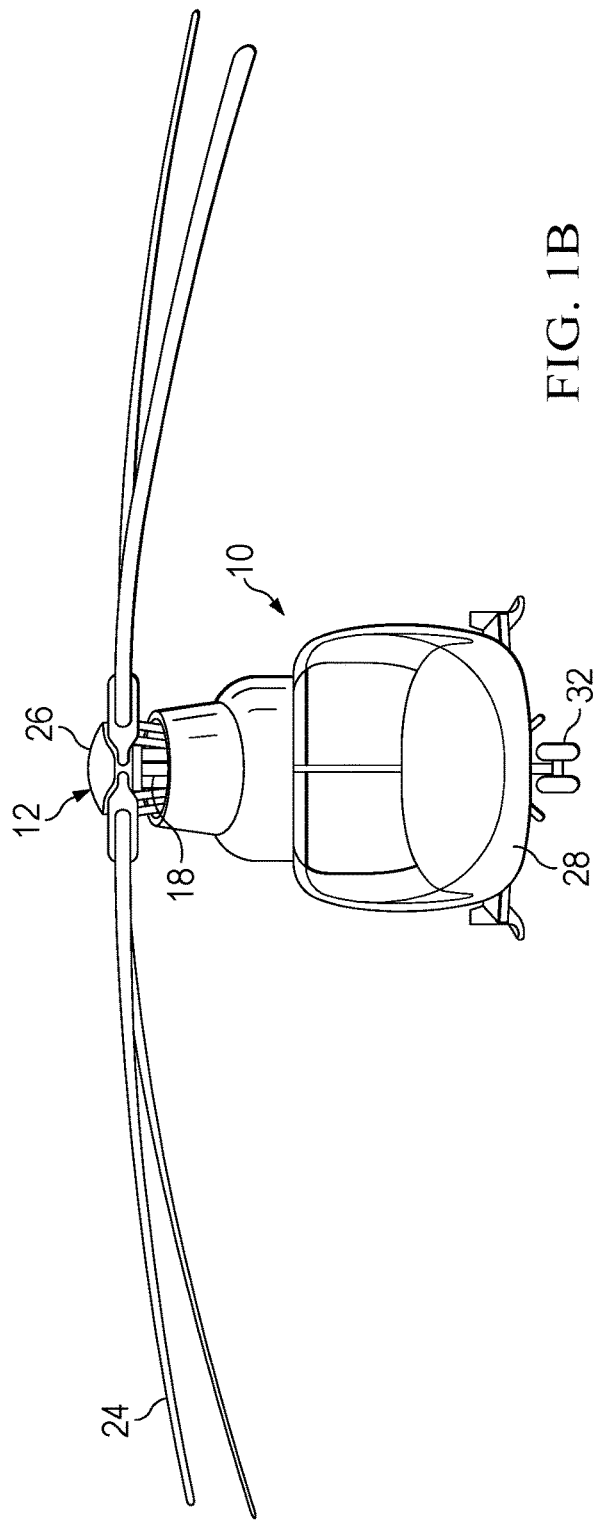
Figure 1C:
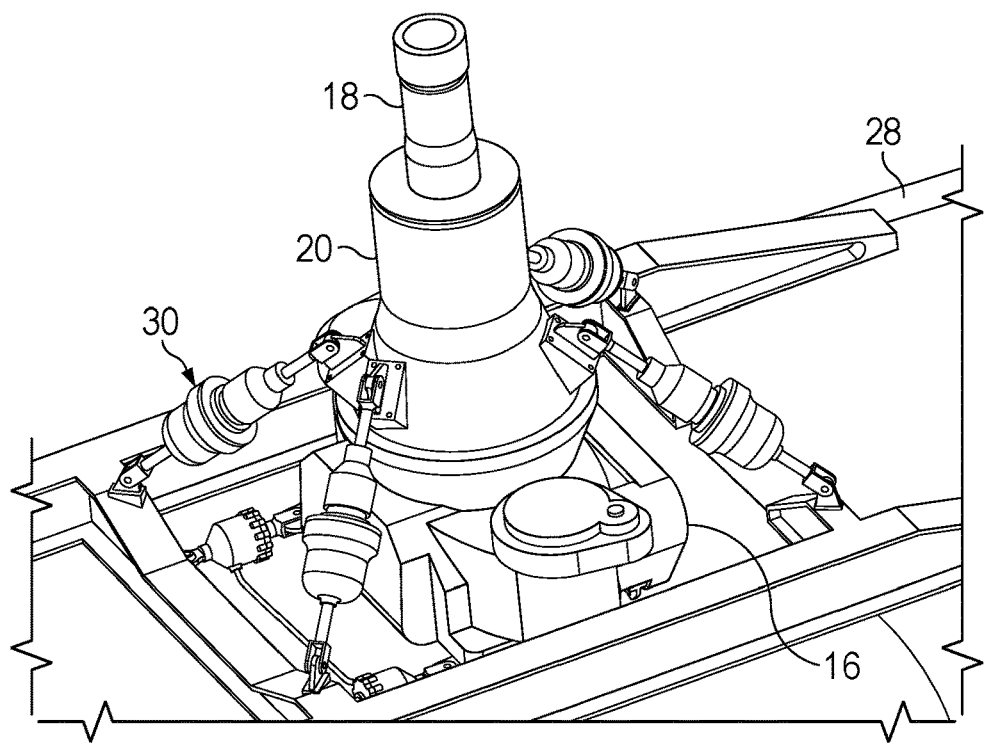

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1D in the drawings, a rotorcraft depicted as a helicopter is schematically illustrated and generally designated 10. The primary propulsion assembly of helicopter 10 includes a main rotor assembly 12 powered by an engine 14 via a main rotor gearbox 16. A mast 18 extends through a top case 20, which houses a mast bearing assembly 22 to facilitate the stable rotation of mast 18. Main rotor assembly 12 includes a plurality of rotor blade assemblies 24 extending radially outward from a main rotor hub 26. Main rotor assembly 12 is coupled to a fuselage 28. A vibration isolation system 30 may be utilized to isolate the vibration of main rotor assembly 12 from fuselage 18 including the various the components housed therein as well as the passengers therein. Main rotor hub 26 is rotatable relative to fuselage 28. The pitch of rotor blade assemblies 24 can be collectively and/or cyclically manipulated to selectively control direction, thrust and lift of helicopter 10. A landing gear system 32 provides ground support for helicopter 10. A tailboom 34 extends from fuselage 28 in the aft direction. An anti-torque system 36 includes a tail rotor 38 that is rotatably coupled to the aft portion of tailboom 34. Anti-torque system 36 controls the yaw of helicopter 10.

Figure 1D:
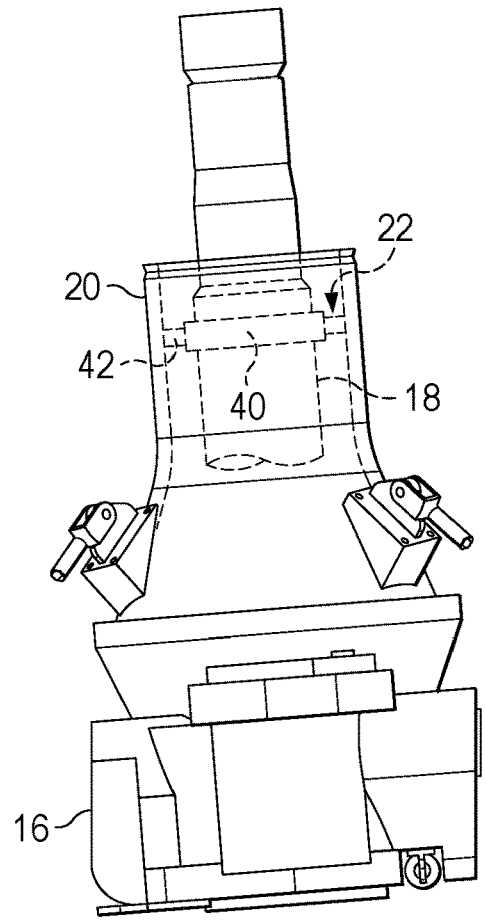

As best seen in FIG. 1D, mast 18 is machined or otherwise formed to include an internal ledge, a raceway station and an external ridge with at least a portion of the raceway station structurally positioned axially between the internal ledge and the external ridge. A raceway 40, annular in shape and nonintegral with mast 18, forms press fit joint with mast 18 at the raceway station. The press fit joint formed between nonintegral raceway 40 and mast 18 encompasses a variety of fits including an interference fit, friction fit, force fit, hydraulic dilation fit and other types of fits that do not require a fastener to couple nonintegral raceway 40 to mast 18. The internal ledge and external ridge of mast 18 cooperate to secure nonintegral raceway 40 at the raceway station by axially biasing nonintegral raceway 40 toward the external ridge responsive to a nonuniform normal force created by the internal ledge that acts between mast 18 and nonintegral raceway 40 along the raceway station. In some embodiments, nonintegral raceway 40 is formed from a different material than mast 18 so that nonintegral raceway 40 can endure bearing stresses while mast 18 exhibits suitable corrosion resistance properties. Roller bearings 42 of mast bearing assembly 22, which may carry reactions in the shear direction, circumferentially face mast 18 to engage nonintegral raceway 40. Nonintegral raceway 40 provides a smooth, hardened surface on which roller bearings 42 may roll. In other embodiments, tail rotor 38 may also utilize a raceway to engage with bearings therein.

Figure 2A:
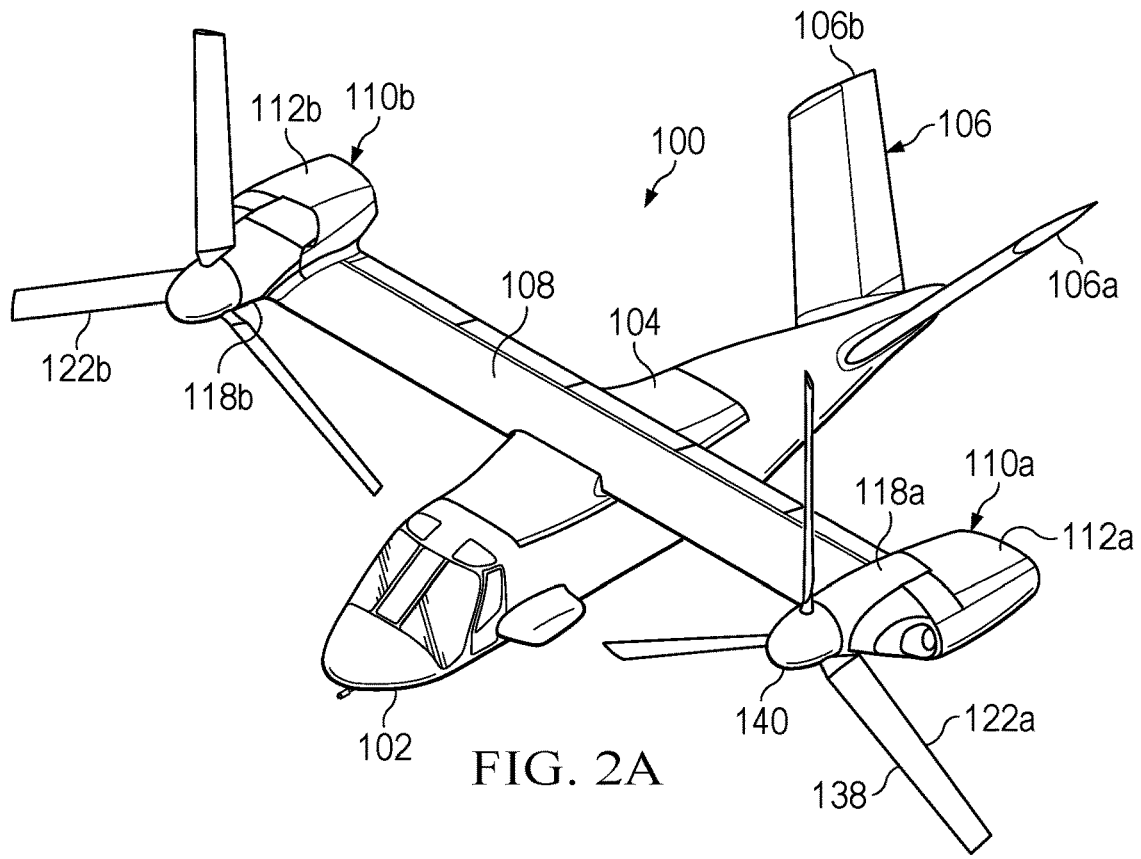
FIGS. 2A-2D are schematic illustrations of a tiltrotor aircraft and components parts thereof having propulsion assemblies utilizing masts having axially biased nonintegral raceways in accordance with embodiments of the present disclosure.
Figure 2B:
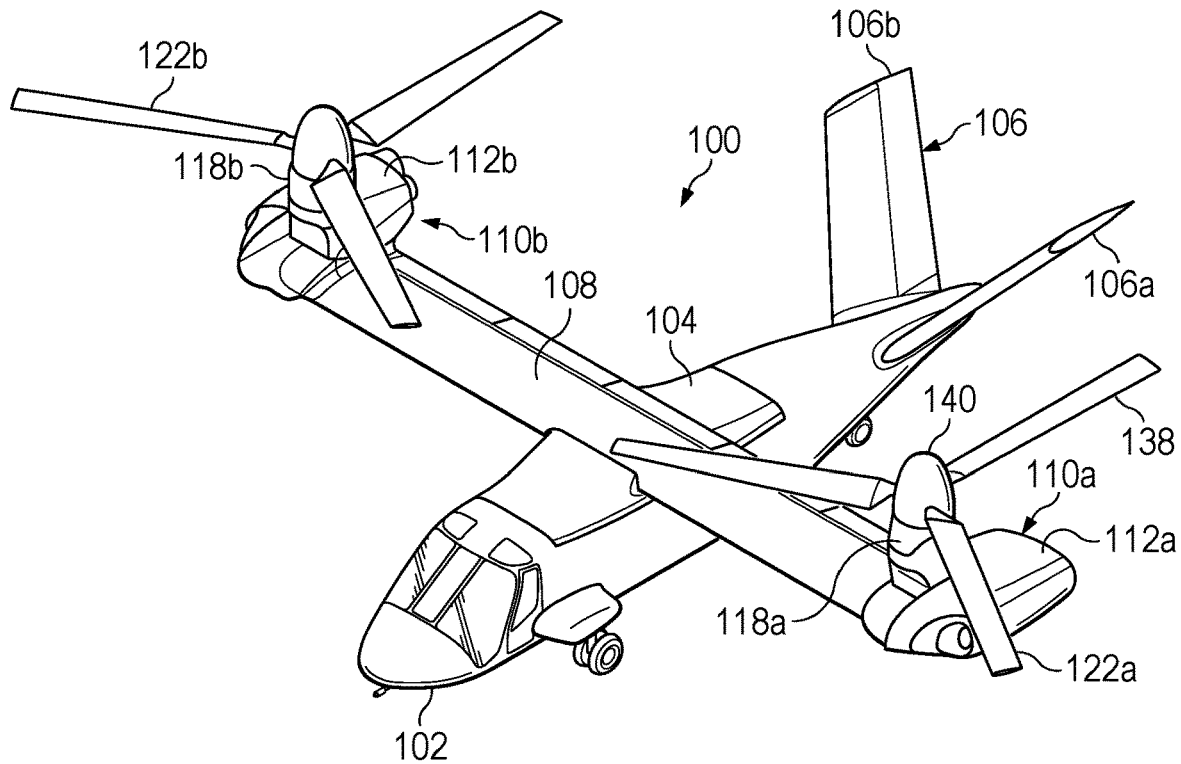
Figure 2C:
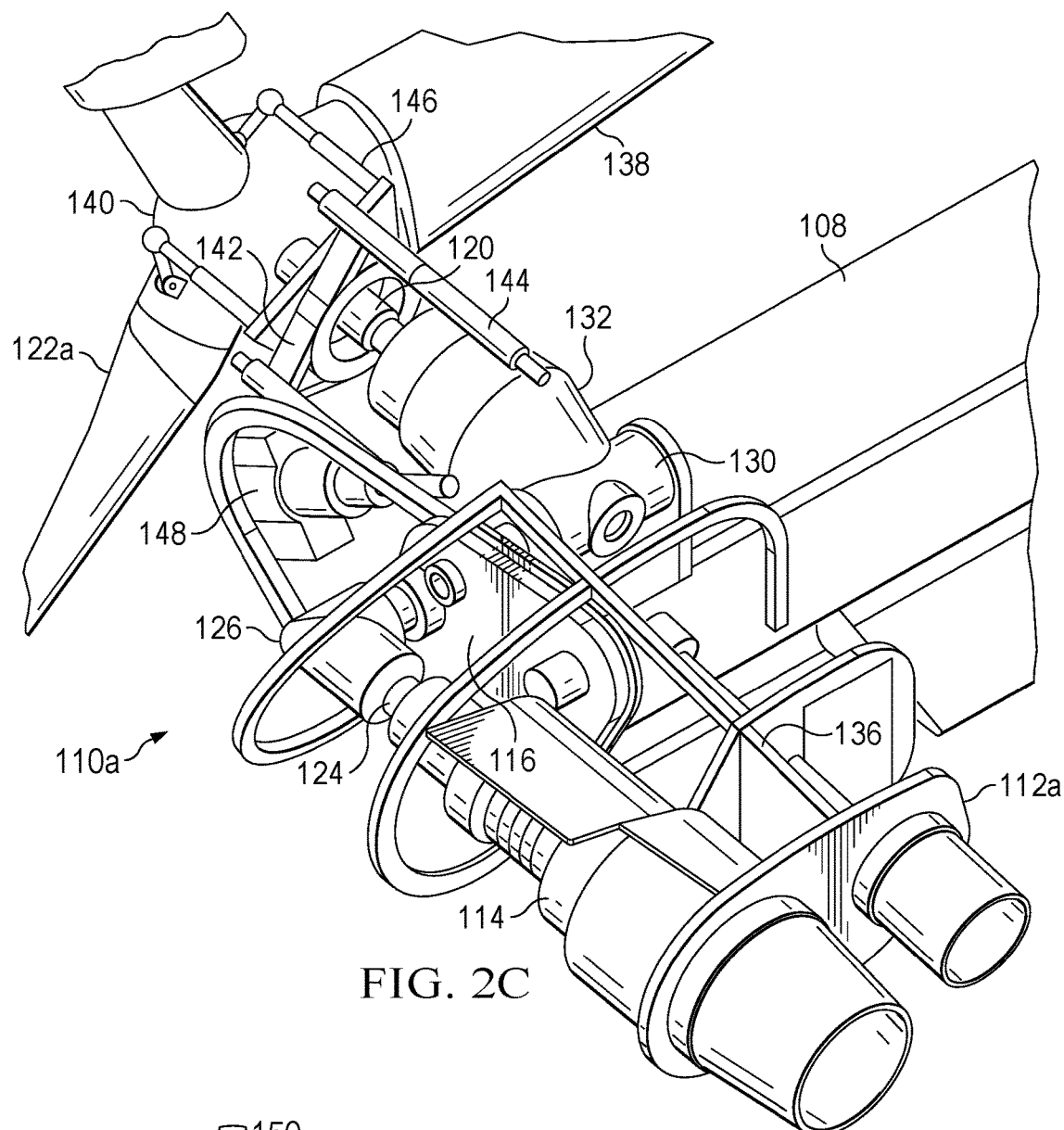
Figure 2D:
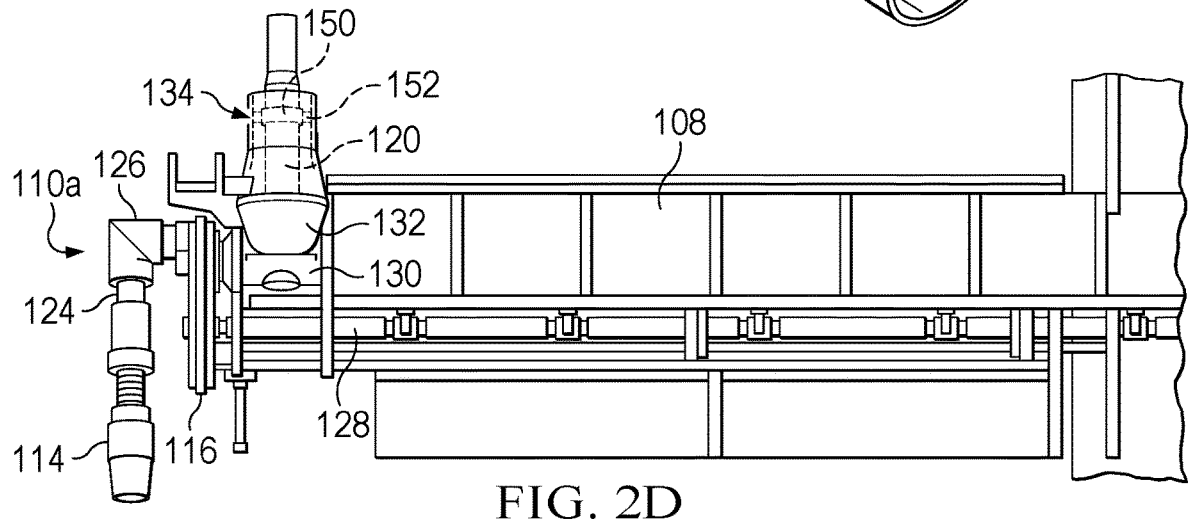

Referring now to FIGS. 2A-2D in the drawings, a rotorcraft depicted as a tiltrotor aircraft is schematically illustrated and generally designated 100. Tiltrotor aircraft 100 includes a fuselage 102, a wing mount assembly 104 and a tail assembly 106 including rotatably mounted tail members 106a, 106b having control surfaces operable for horizontal and/or vertical stabilization during forward flight. A wing member 108 is supported by wing mount assembly 104. Coupled to outboard ends of wing member 108 are propulsion assemblies 110a, 110b. Propulsion assembly 110a includes a nacelle depicted as fixed pylon 112a that houses an engine 114 and a transmission 116. Thus, the nacelle is fixed relative to wing member 108. In addition, propulsion assembly 110a includes a mast assembly 118a including a mast 120 that is rotatable relative to fixed pylon 112a, wing member 108 and fuselage 102 between a generally horizontal orientation, as best seen in FIGS. 2A, 2C and 2D, and a generally vertical orientation, as best seen in FIG. 2B. Propulsion assembly 110a also includes a proprotor assembly 122a having three proprotor blades which is rotatable responsive to torque and rotational energy provided via a rotor hub assembly and drive system mechanically coupled to engine 114 and transmission 116. Similarly, propulsion assembly 110b includes a nacelle depicted as fixed pylon 112b that houses an engine and transmission and a mast assembly 118b that is rotatable relative to fixed pylon 112b, wing member 108 and fuselage 102. Propulsion assembly 110b also includes a proprotor assembly 122b having three proprotor blades which is rotatable responsive to torque and rotational energy provided via a rotor hub assembly and drive system mechanically coupled to the engine and transmission housed by fixed pylon 112b.

FIG. 2A illustrates tiltrotor aircraft 100 in airplane or forward flight mode, in which proprotor assemblies 122a, 122b are rotating in a substantially vertical plane to provide a forward thrust enabling wing member 108 to provide a lifting force responsive to forward airspeed, such that tiltrotor aircraft 100 flies much like a conventional propeller driven aircraft. FIG. 2B illustrates tiltrotor aircraft 100 in helicopter or vertical takeoff and landing (VTOL) flight mode, in which proprotor assemblies 122a, 122b are rotating in a substantially horizontal plane to provide a lifting thrust, such that tiltrotor aircraft 100 flies much like a conventional helicopter. It should be appreciated that tiltrotor aircraft 100 can be operated such that proprotor assemblies 122a, 122b are selectively positioned between forward flight mode and VTOL flight mode, which can be referred to as a conversion flight mode. Even though tiltrotor aircraft 100 has been described as having one engine in each fixed pylon 112a, 112b, it should be understood by those having ordinary skill in the art that other engine arrangements are possible and are considered to be within the scope of the present disclosure including, for example, having a single engine which may be housed within fuselage 102 that provides torque and rotational energy to both proprotor assemblies 122a, 122b.

Referring now to FIGS. 2C-2D, propulsion assembly 110a is disclosed in further detail. Propulsion assembly 110a is substantially similar to propulsion assembly 110b therefore, for sake of efficiency, certain features will be disclosed only with regard to propulsion assembly 110a. One having ordinary skill in the art, however, will fully appreciate an understanding of propulsion assembly 110b based upon the disclosure herein of propulsion assembly 110a. Engine 114 of propulsion assembly 110a is substantially fixed relative to wing 108. An engine output shaft 124 transfers power from engine 114 to a spiral bevel gearbox 126 that includes spiral bevel gears to change torque direction by 90 degrees from engine 114 to fixed transmission depicted as gearbox 116. Fixed gearbox 116 includes a plurality of gears, such as helical gears, in a gear train that are coupled to an interconnect drive shaft 128 and a quill shaft (not visible) that supplies torque to an input in spindle gearbox 130 of proprotor gearbox 132 that houses a mast bearing assembly 134. Interconnect drive shaft 128 provides a torque path that enables a single engine of tiltrotor aircraft 100 to provide torque to both proprotor assemblies 122a, 122b in the event of a failure of the other engine. In the illustrated embodiment, interconnect drive shaft 128 includes a plurality of segments that share a common rotational axis.

Engine 114 is housed and supported in fixed pylon 112a (see FIGS. 2A-2B) that may include features such as an inlet, aerodynamic fairings and exhaust, as well as other structures and systems to support and facilitate the operation of engine 114. The airframe of tiltrotor aircraft 100, which supports the various sections of tiltrotor aircraft 100 including fuselage 102, includes a propulsion assembly airframe section 136 that supports propulsion assembly 110a. Proprotor assembly 122a of propulsion assembly 110a includes three rotor blade assemblies 138 that are coupled to a rotor hub 140. Rotor hub 140 is coupled to mast 120 that is coupled to proprotor gearbox 132. Together, spindle gearbox 130, proprotor gearbox 132 and mast 120 are part of mast assembly 118a that rotates relative to fixed pylon 112a. In addition, it should be appreciated by those having ordinary skill in the art that mast assembly 118a may include different or additional components, such as a pitch control assembly depicted as swashplate 142, actuators 144 and pitch links 146, wherein swashplate 142 is selectively actuated by actuators 144 to selectively control the collective pitch and the cyclic pitch of rotor blade assemblies 138 via pitch links 146. A linear actuator, depicted as conversion actuator 148 of fixed pylon 112a, is operable to reversibly rotate mast assembly 118a relative to fixed pylon 112a, which in turn selectively positions proprotor assembly 122a between forward flight mode, in which proprotor assembly 122a is rotating in a substantially vertical plane, and VTOL flight mode, in which proprotor assembly 122a is rotating in a substantially horizontal plane. As best seen in FIG. 2D, a nonintegral raceway 150 forms a press fit joint with mast 120 at a raceway station that is structurally positioned axially between an internal ledge and an external ridge of mast 120. Roller bearings 152 of mast bearing assembly 134 face mast 120 to engage nonintegral raceway 150, thereby supporting mast 120. Nonintegral raceway 150 provides a smooth, hardened surface on which roller bearings 152 may roll. Nonintegral raceway 150 is similar to nonintegral raceway 40 of helicopter 10 except that it is adapted to tiltrotor aircraft 100, demonstrating the versatility and applicability of such a nonintegral raceway to a wide range of aviation environments.

It should be appreciated that helicopter 10 and tiltrotor aircraft 100 are merely illustrative of a variety of aircraft that can implement the embodiments disclosed herein. Indeed, propulsion assemblies utilizing masts 18, 120 and/or nonintegral raceways 44, 150 may be implemented on any rotorcraft. Other aircraft implementations can include hybrid aircraft, tiltwing aircraft, quad tiltrotor aircraft, unmanned aircraft, gyrocopters, propeller-driven airplanes, compound helicopters, drones and the like. As such, those skilled in the art will recognize that propulsion assemblies utilizing masts 18, 120 and/or nonintegral raceways 44, 150 can be integrated into a variety of aircraft configurations. It should be appreciated that even though aircraft are particularly well-suited to implement the embodiments of the present disclosure, non-aircraft vehicles and devices can also implement the embodiments.

Figure 3B:
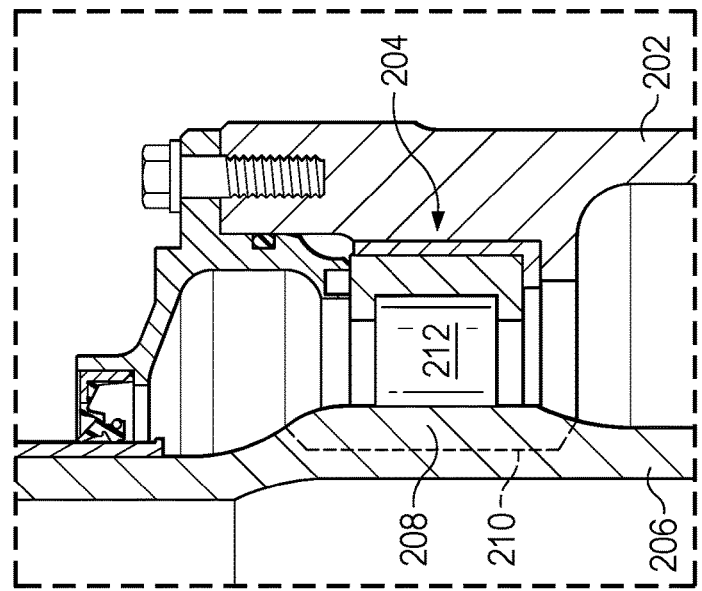
FIGS. 3A-3B are prior art drawings depicting a propulsion assembly utilizing a mast having an integral raceway.
Figure 3A:
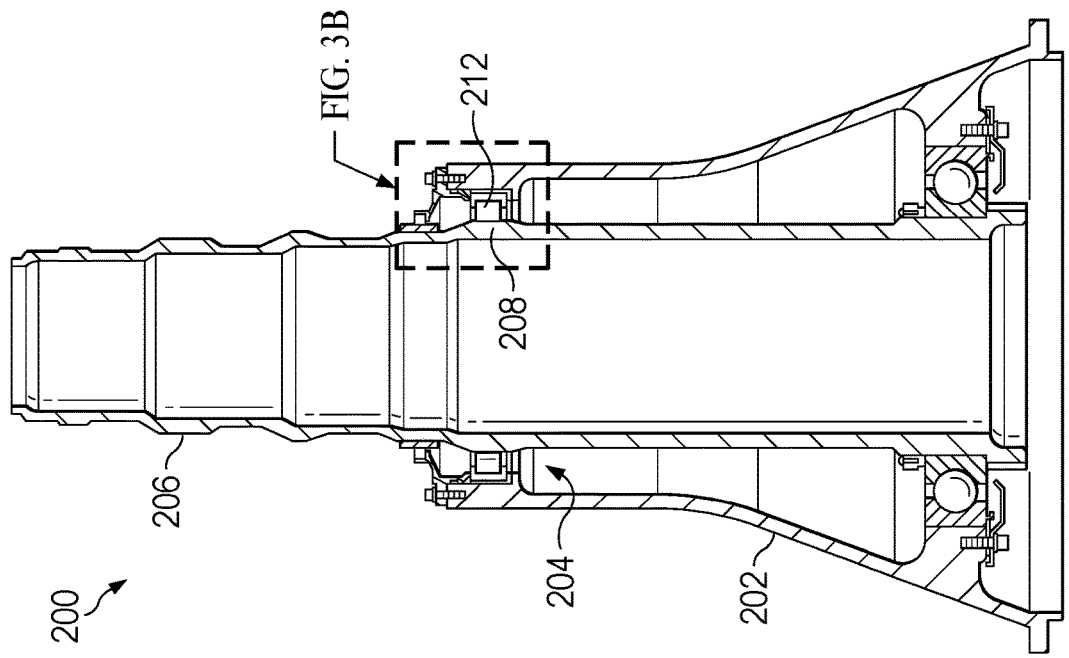

Referring to FIGS. 3A-3D in the drawings, various raceway configurations for propulsion assemblies are schematically illustrated. In FIGS. 3A-3B, propulsion assembly 200 includes top case 202 in which mast bearing assembly 204 supports the stable rotation of mast 206. Propulsion assembly 200 utilizes an integral raceway configuration in which raceway 208 is integral with and formed from the same material as mast 206. Portion 210 of mast 206 that forms raceway 208 is heat treated to provide a hard and durable surface on which roller bearings 212 may roll. In one non-limiting example, portion 210 of mast 206 that forms raceway 208 may be heat treated to a depth in a range between 25 and 150 thousandths of an inch such as in a range between 50 and 100 thousandths of an inch. Because the mast itself is heat treated to form raceway 208, the material from which mast 206 may be formed is restricted to steel that can be induction hardened such as 4340 alloy steel or steel that can be carburized such as X53 alloy steel. Steel types that can be case hardened or locally hardened to form sufficiently effective raceways, however, tend to have poor corrosion resistance, and may, for example, tend to corrode at the hub spline and require replacement at high intervals depending on the working environment. While corrosion issues can be mitigated by using certain stainless steels for mast 206, the integral raceway configuration of propulsion assembly 200 requires a case hardened surface which cannot be sufficiently achieved with stainless steel materials.

Figure 3D:
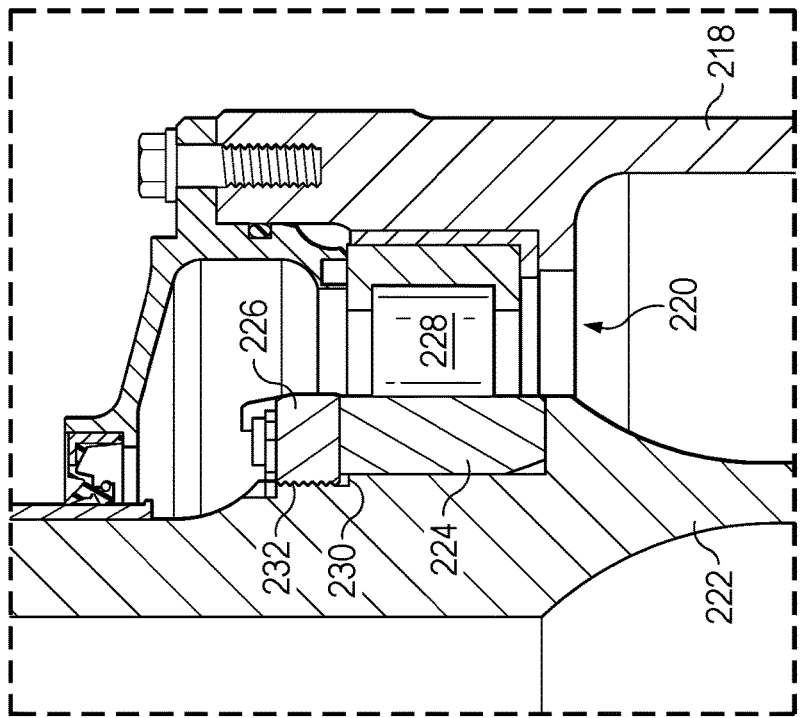
FIGS. 3C-3D are prior art drawings depicting a propulsion assembly utilizing a mast having a fastener-mounted nonintegral raceway.
Figure 3C:
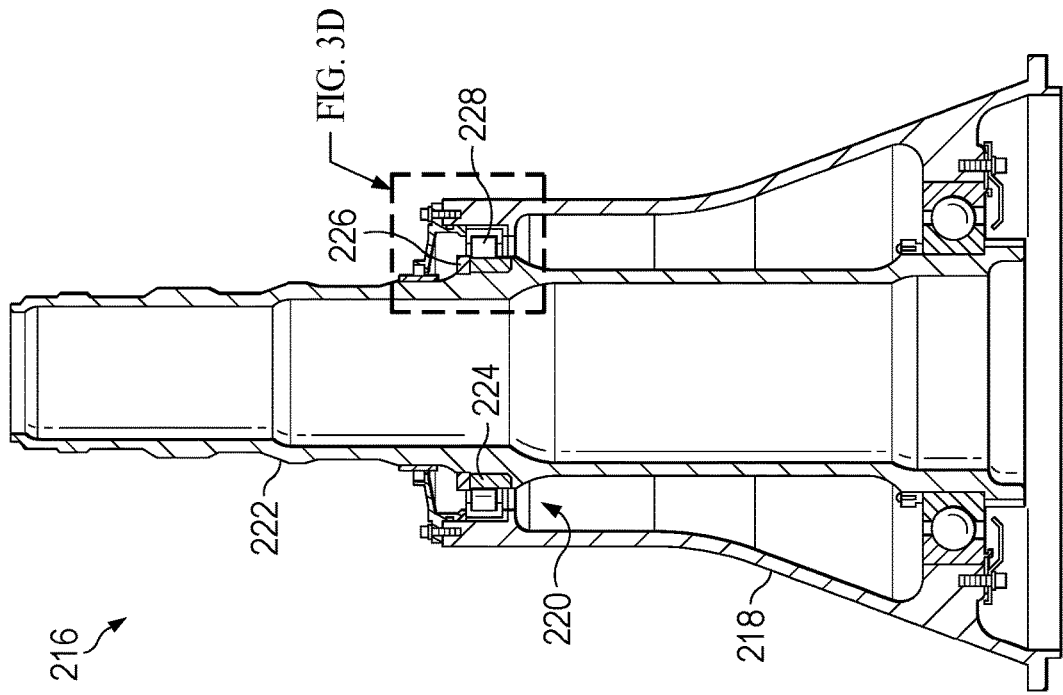

In FIGS. 3C-3D, propulsion assembly 216 includes top case 218, in which mast bearing assembly 220 supports the stable rotation of mast 222. A raceway 224 that is utilized by propulsion assembly 216 is not integral with mast 222. Instead, raceway 224 is retained or coupled onto mast 222 using a threaded lock ring 226, nuts and other fasteners. Because raceway 224 is not integral with mast 222, raceway 224 may be hardened independently of mast 222. Raceway 224 may also be formed from a material that can be sufficiently hardened to act as a raceway for roller bearings 228, while mast 222 may be formed from a corrosion resistant material, such as stainless steel, which does not require case hardened as mast 222 does not endure bearing stresses. The fasteners, such as lock ring 226, used to retain raceway 224 on mast 222, however, present other drawbacks for propulsion assembly 216. For example, the local roller bearing and contact stress loads around raceway 224 and bending stresses of mast 222 require a tight fit between mast 222 and raceway 224. Fasteners 226 leave undesirable spaces, such as space 230, between mast 222 and raceway 224, which may cause undesirable and structurally compromising motions in response to such contact and bending stresses. Threads 232 also require intricate machining that cause local stress concentrations in response to mast bending, thereby generating structural fatigue. The stress concentrations occurring at threads 232 are in an undesirable location due to induced cyclic loading during flight. Fastening raceway 224 onto mast 222 using fasteners such as lock ring 226 also requires additional parts, which add more weight, cost and complexity to the rotorcraft.

Referring to FIGS. 4A-4B in the drawings, a propulsion assembly 300 utilizing a nonintegral raceway 302 of the illustrative embodiments is schematically illustrated. Propulsion assembly 300 includes top case 304, which houses a mast bearing assembly 306a to support the stable rotation of a mast 308. Mast 308 includes an internal ledge 310 and a raceway station 312 that is defined as the exterior surface of mast 308 opposite of internal ledge 310. Nonintegral raceway 302 is received and retained at raceway station 312 by a press fit joint 314 that is formed between nonintegral raceway 302 and mast 308. As illustrated, internal ledge 310 has an axial length that is greater than or equal to the axial length of nonintegral raceway 302 such that the normal force between nonintegral raceway 302 and mast 308 along raceway station 312 is uniform, as indicated by the uniform size of normal force arrows 316. In addition to press fit joint 314 between nonintegral raceway 302 and mast 308, the application of the uniform normal force along raceway station 312 between nonintegral raceway 302 and mast 308 tends to prevent or reduce translation or axial motion of nonintegral raceway 302 along mast 308 due to loads or deflections during operation, thereby securing nonintegral raceway 302 at raceway station 312.

In the illustrated embodiment, internal ledge 310 extends circumferentially around the interior of mast 308. In other embodiments, an internal ledge may extend only partially around the internal circumference of mast 308, for example, an internal ledge may be formed from two or more internal ledge sections. In the illustrated embodiment, internal ledge 310 has a maximum wall thickness, indicated by line 318, that is between 1.5 and 3 times the wall thickness of the adjacent sections of mast 308, indicated by line 320. For example, the maximum wall thickness 318 of internal ledge 310 may be between 1.75 and 2.5 times the wall thickness 320 the adjacent sections of mast 308. In another example, the maximum wall thickness 318 of internal ledge 310 may be about 2 times the wall thickness 320 of the adjacent sections of mast 308. In other embodiments, the maximum wall thickness 318 of internal ledge 310 may be greater than 3 times or less than 1.5 times the wall thickness 320 of the adjacent sections of mast 308. Internal ledge 310 has a proximal profile 324 and a distal profile 326, wherein the term "profile" refers to the transition region between the maximum wall thickness 318 of internal ledge 310 and the wall thickness 320 of the adjacent sections of mast 308. In the illustrated embodiment, proximal profile 324 is an arcuate profile and distal profile 326 is an arcuate profile having the same radius of curvature as the arcuate profile of proximal profile 324, which is referred to herein as having common profiles. In other embodiments, proximal profile 324 and distal profile 326 could have profiles with alternate shapes, such as tapered profiles. Also, in other embodiments, proximal profile 324 and distal profile 326 could be dissimilar profiles. For example, proximal profile 324 and distal profile 326 could have different radii of curvature, one of proximal profile 324 and distal profile 326 could have an arcuate profile with the other of proximal profile 324 and distal profile 326 having a tapered profile or each of proximal profile 324 and distal profile 326 could have a tapered profile but with different slope angles.

Because nonintegral raceway 302 is not integral with mast 308, nonintegral raceway 302 may be formed from a different material than mast 308. For example, nonintegral raceway 302 may be formed from a high strength, high hardness steel such as a high-speed steel used to form roller bearings in high stress aviation applications. In the illustrated embodiment, nonintegral raceway 302 is a through-hardened raceway that provides a smooth, hard and durable outer surface against which roller bearings 328 may engage. In one non-limiting example, nonintegral raceway 302 may be hardened in a range between 50 and 70 on the Rockwell hardness scale. Nonintegral raceway 302 may be formed from a high strength and wear resistance material that may be case-hardened or through-hardened such as a steel alloy including combinations of tungsten, manganese, silicon, chromium, nickel, vanadium, cobalt and/or molybdenum. In one non-limiting example, nonintegral raceway 302 may be formed from a M50 alloy steel such as M50 NiL alloy steel, which is capable of being hardened such as by carburization, a case hardening process used to increase the carbon content of the alloy steel. Mast 308 is not restricted to being formed from a material capable of being hardened to a level necessary to function as the raceway. Mast 308 may instead be formed from a material that is corrosion resistant such as a stainless steel including PH13-8Mo, 17-4PH and 15-5PH stainless steels or a titanium such as Ti-6Al-4V titanium. In one non-limiting example, mast 308 may have a hardness in a range between 30 and 45 on the Rockwell hardness scale.

The dimensions of nonintegral raceway 302 and mast 308 may vary widely depending on the aircraft or application in which nonintegral raceway 302 and mast 308 are implemented. For a piloted helicopter, in one non-limiting example, the outer diameter of mast 208 may range between 4 and 16 inches such as between 6 and 10 inches or about 8 inches. For such masts, the outer diameter of nonintegral raceway 302 may range between 5 and 18 inches such as between 7 and 12 inches or about 9.5 inches.

In addition to mast bearing assembly 306a, top case 304 houses a thrust bearing assembly 306b that may carry the shear and thrust loads of propulsion assembly 300. In some embodiments, thrust bearing assembly 306b may include a nonintegral raceway with an outer concavity to contour the ball bearings therein, and such concave nonintegral raceway may be press fit onto mast 308. In other embodiments, the ball bearings of thrust bearing assembly 306b may be replaced with roller bearings and may engage with a raceway similar to nonintegral raceway 302. In yet other embodiments, roller bearings 328 may instead be ball bearings in which case, the outer surface of nonintegral raceway 302 may form a concave surface to contour the ball bearings.

Figure 5B:
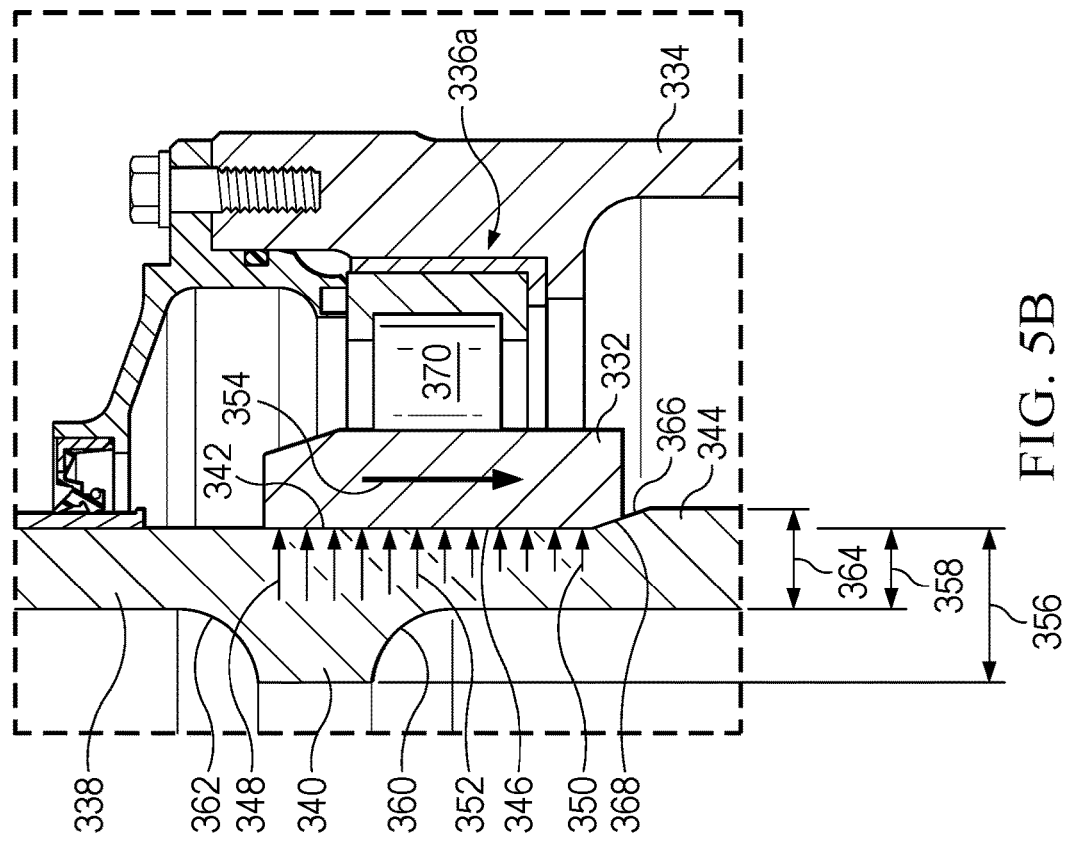
FIGS. 5A-5B are cross-sectional views of a propulsion assembly utilizing a mast having an axially biased nonintegral raceway in accordance with embodiments of the present disclosure.
Figure 5A:
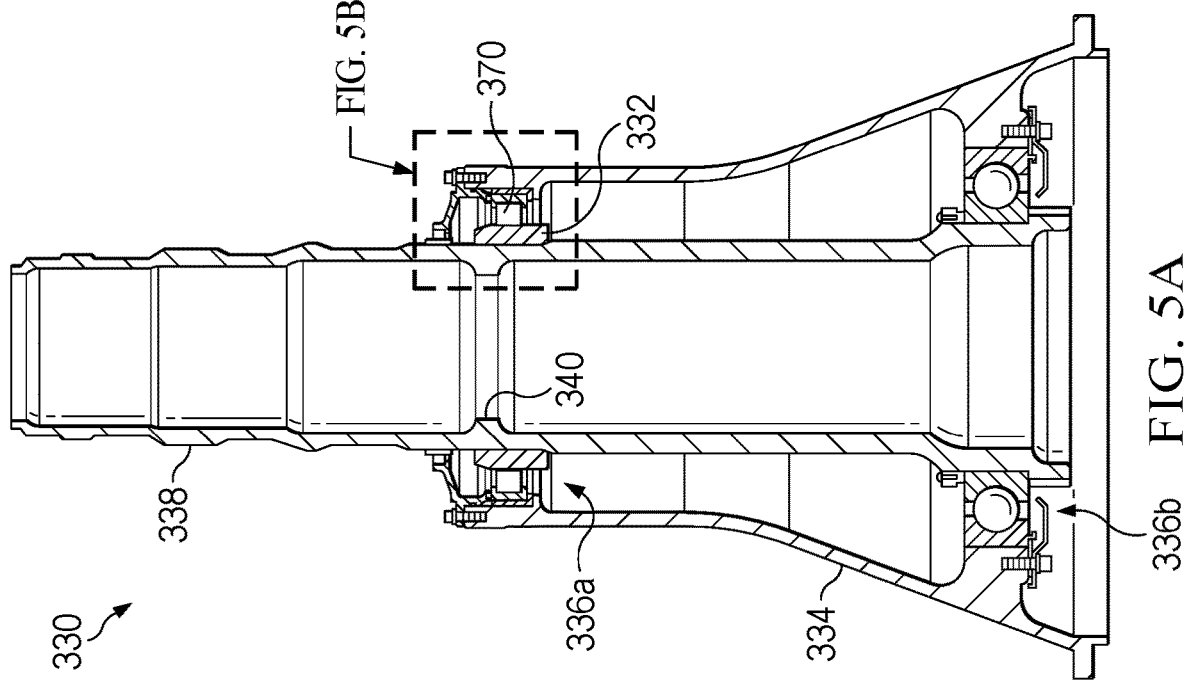

Referring to FIGS. 5A-5B in the drawings, a propulsion assembly 330 utilizing a nonintegral raceway 332 of the illustrative embodiments is schematically illustrated. Propulsion assembly 330 includes top case 334, which houses a mast bearing assembly 336a to support the stable rotation of a mast 338. Mast 338 includes an internal ledge 340, a raceway station 342 and external ridge 344 with at least a portion of raceway station 342 positioned axially between internal ledge 340 and external ridge 344. Nonintegral raceway 332 is received and retained at raceway station 342 by a press fit joint 346 that is formed between nonintegral raceway 332 and mast 338. As illustrated, internal ledge 340 is axial positioned proximate a distal end of nonintegral raceway 332 and has an axial length that is less than the axial length of nonintegral raceway 332 such that the normal force between nonintegral raceway 332 and mast 338 along raceway station 312 is nonuniform. In the illustrated embodiment, the normal force is at a maximum toward the distal end of nonintegral raceway 332, as indicated by large normal force arrows 348, the normal force is at a minimum toward the proximal end of nonintegral raceway 332, as indicated by small normal force arrows 350 and the normal force progressively decreases from the maximum to the minimum along a middle portion of nonintegral raceway 332, as indicated by progressively varying normal force arrows 352.

In addition to press fit joint 346 between nonintegral raceway 332 and mast 338, the application of the nonuniform normal force along raceway station 342 between nonintegral raceway 332 and mast 338 tends to axially bias nonintegral raceway 332 toward external ridge 344, as indicated by axial force arrow 354, which prevents or reduces translation or axial motion of nonintegral raceway 332 toward the distal end of mast 338 due to loads or deflections during operation, thereby securing nonintegral raceway 332 at raceway station 342. In addition, external ridge 344 provides a hard stop for nonintegral raceway 332 which prevents further translation or axial motion of nonintegral raceway 332 toward the proximal end of mast 338 due to loads or deflections during operation, thereby securing nonintegral raceway 332 at raceway station 342. As such, the axial bias force 354 created by the nonuniform normal force along raceway station 342 secures nonintegral raceway 332 against axial movement in the distal direction of mast 338 and external ridge 344 secures nonintegral raceway 332 against axial movement in the proximal direction of mast 338.

In the illustrated embodiment, internal ledge 340 and external ridge 344 extend circumferentially around mast 338. In other embodiments, an internal ledge and/or an external ridge may extend only partially circumferentially around mast 338 being formed, for example, from two or more sections instead of as a single circumferential feature. In the illustrated embodiment, internal ledge 340 has a maximum wall thickness, indicated by line 356, that is between 1.5 and 3 times the wall thickness of mast 338 adjacent to external ridge 344, indicated by line 358. For example, the maximum wall thickness 356 of internal ledge 340 may be between 1.75 and 2.5 times the wall thickness 358 of mast 338 adjacent to external ridge 344. In another example, the maximum wall thickness 356 of internal ledge 340 may be about 2 times the wall thickness 358 of mast 338 adjacent to external ridge 344. In other embodiments, the maximum wall thickness 356 of internal ledge 340 may be greater than 3 times or less than 1.5 times the wall thickness 358 of mast 338 adjacent to external ridge 344. Internal ledge 340 has a proximal profile 360 and a distal profile 362. In the illustrated embodiment, proximal profile 360 is an arcuate profile and distal profile 362 is an arcuate profile having the same radius of curvature as the arcuate profile of proximal profile 360.

In the illustrated embodiment, external ridge 344 has a wall thickness, indicated by line 364, that is between 1.1 and 1.3 times the wall thickness of mast 338 adjacent to external ridge 344, indicated by line 358. For example, the wall thickness 364 of external ridge 344 may be between 1.15 and 1.25 times the wall thickness 358 of mast 338 adjacent to external ridge 344. In another example, the wall thickness 364 of external ridge 344 may be about 1.2 times the wall thickness 358 of mast 338 adjacent to external ridge 344. In other embodiments, the wall thickness 364 of external ridge 344 may be greater than 1.3 times or less than 1.1 times the wall thickness 358 of mast 338 adjacent to external ridge 344. External ridge 344 has a distal profile 366 that is a conical or tapered profile having a lead in angle that is between 15 and 35 degrees such as a lead in angle that is between 20 and 25 degrees or a lead in angle that is about 25 degrees. In other embodiments, the lead in angle of tapered profile 366 may be greater than 35 degrees or less than 15 degrees. In the illustrated embodiment, nonintegral raceway 332 has a conical or tapered inner edge 368 that mates with and corresponds to tapered profile 366 of external ridge 344. The axial length of tapered profile 366 of external ridge 344 may be between 1.5 and 3 times longer than tapered inner edge 368 of nonintegral raceway 332 such as about 2 times longer than tapered inner edge 368 of nonintegral raceway 332. In other embodiments, the axial length of tapered profile 366 may be greater than 3 times or less than 1.5 times longer than tapered inner edge 368 of nonintegral raceway 332.

Nonintegral raceway 332 may be formed from a different material than mast 338. For example, nonintegral raceway 332 may be formed from a hardened steel such as from a M50 alloy steel including M50 NiL alloy steel and mast 338 may be formed from a corrosion resistant material such as stainless steel or titanium. In the illustrated embodiment, nonintegral raceway 332 is a through-hardened raceway that provides a smooth, hard and durable outer surface against which roller bearings 370 may engage. In addition to mast bearing assembly 336a, top case 334 houses a thrust bearing assembly 336b that may carry the shear and thrust loads of propulsion assembly 330.

Figure 6B:
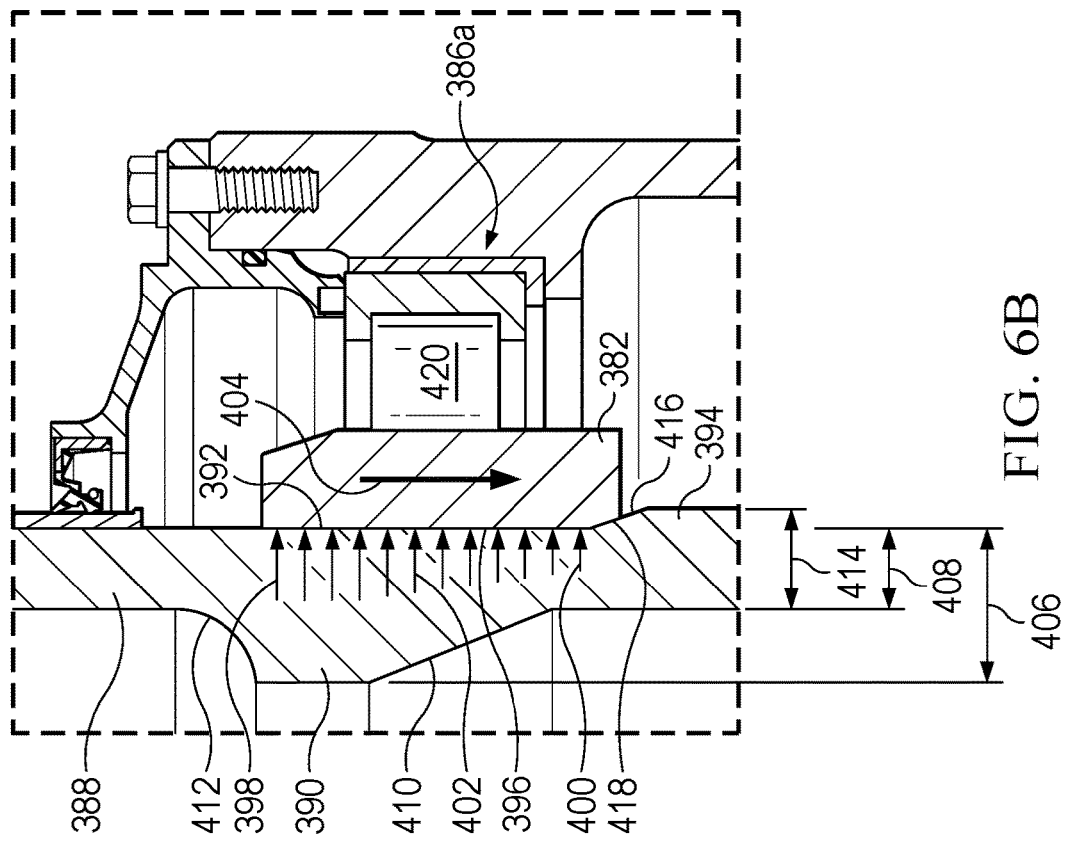
FIGS. 6A-6B are cross-sectional views of a propulsion assembly utilizing a mast having an axially biased nonintegral raceway in accordance with embodiments of the present disclosure.
Figure 6A:
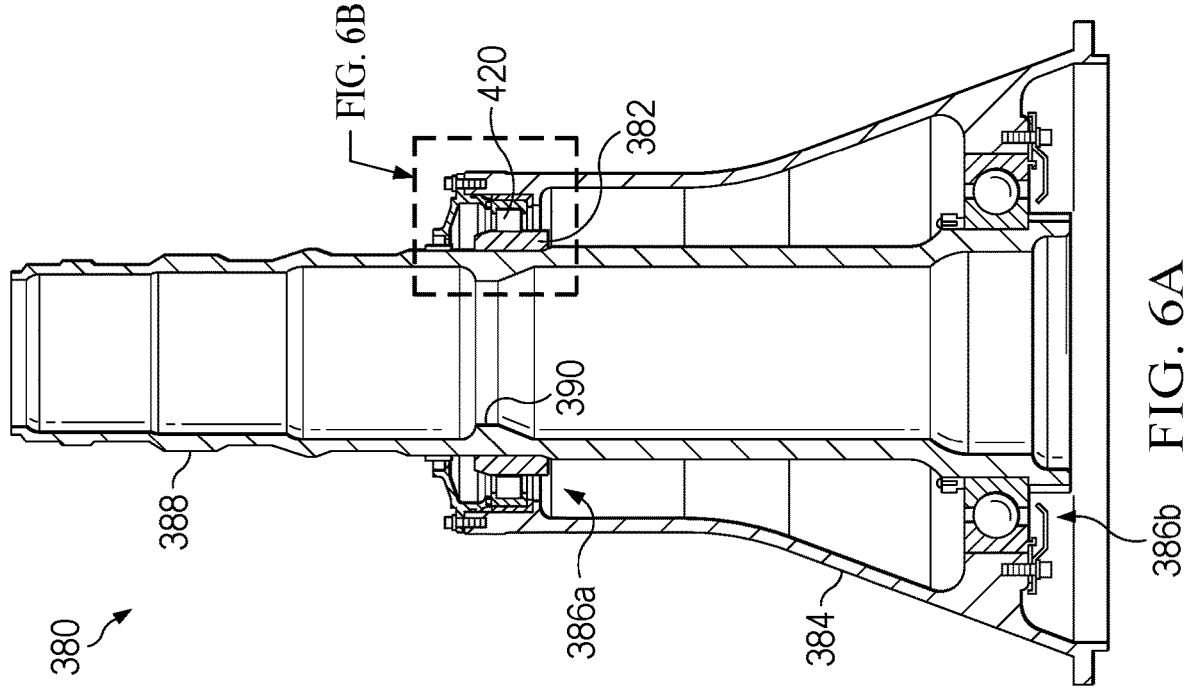

Referring to FIGS. 6A-6B in the drawings, a propulsion assembly 380 utilizing a nonintegral raceway 382 of the illustrative embodiments is schematically illustrated. Propulsion assembly 380 includes top case 384, which houses a mast bearing assembly 386a to support the stable rotation of a mast 388. Mast 388 includes an internal ledge 390, a raceway station 392 and external ridge 394 with at least a portion of raceway station 392 positioned axially between internal ledge 390 and external ridge 394. Nonintegral raceway 382 is received and retained at raceway station 392 by a press fit joint 396 that is formed between nonintegral raceway 382 and mast 388. As illustrated, internal ledge 390 is axial positioned proximate a distal end of nonintegral raceway 382 and has an axial length that is less than the axial length of nonintegral raceway 382 such that the normal force between nonintegral raceway 382 and mast 388 along raceway station 392 is nonuniform. In the illustrated embodiment, the normal force is at a maximum toward the distal end of nonintegral raceway 382, as indicated by large normal force arrows 398, the normal force is at a minimum toward the proximal end of nonintegral raceway 382, as indicated by small normal force arrow 400 and the normal force progressively decreases from the maximum to the minimum along a middle portion of nonintegral raceway 382, as indicated by progressively varying normal force arrows 402.

In addition to press fit joint 396 between nonintegral raceway 382 and mast 388, the application of the nonuniform normal force along raceway station 392 between nonintegral raceway 382 and mast 388 tends to axially bias nonintegral raceway 382 toward external ridge 394, as indicated by axial force arrow 404, which prevents or reduces translation or axial motion of nonintegral raceway 382 toward the distal end of mast 388 due to loads or deflections during operation, thereby securing nonintegral raceway 382 at raceway station 392 In addition, external ridge 394 provides a hard stop for nonintegral raceway 382 which prevents further translation or axial motion of nonintegral raceway 382 toward the proximal end of mast 388 due to loads or deflections during operation, thereby securing nonintegral raceway 392 at raceway station 392. As such, the axial bias force 404 created by the nonuniform normal force along raceway station 392 secures nonintegral raceway 382 against axial movement in the distal direction of mast 388 and external ridge 394 secures nonintegral raceway 382 against axial movement in the proximal direction of mast 388.

In the illustrated embodiment, internal ledge 390 and external ridge 394 extend circumferentially around mast 388. In other embodiments, an internal ledge and/or an external ridge may extend only partially circumferentially around mast 388 being formed, for example, from two or more sections instead of as a single circumferential feature. In the illustrated embodiment, internal ledge 390 has a maximum wall thickness, indicated by line 406, that is between 1.5 and 3 times the wall thickness of mast 388 adjacent to external ridge 394, indicated by line 408. For example, the maximum wall thickness 406 of internal ledge 390 may be between 1.75 and 2.5 times the wall thickness 408 of mast 388 adjacent to external ridge 394. In another example, the maximum wall thickness 406 of internal ledge 390 may be about 2 times the wall thickness 408 of mast 388 adjacent to external ridge 394. In other embodiments, the maximum wall thickness 406 of internal ledge 390 may be greater than 3 times or less than 1.5 times the wall thickness 408 of mast 388 adjacent to external ridge 394. Internal ledge 390 has a proximal profile 410 and a distal profile 412. In the illustrated embodiment, proximal profile 410 is a conical or tapered profile and distal profile 412 is an arcuate profile.

In the illustrated embodiment, external ridge 394 has a wall thickness, indicated by line 414, that is between 1.1 and 1.3 times the wall thickness 408 of mast 388. For example, the wall thickness 414 of external ridge 394 may be between 1.15 and 1.25 times the wall thickness 408 of mast 388. In another example, the wall thickness 414 of external ridge 394 may be about 1.2 times the wall thickness 408 of mast 388. In other embodiments, the wall thickness 414 of external ridge 394 may be greater than 1.3 times or less than 1.1 times the wall thickness 408 of mast 388. External ridge 394 has a distal profile 416 that is a conical or tapered profile having a lead in angle that is between 15 and 35 degrees such as a lead in angle that is between 20 and 25 degrees or a lead in angle that is about 25 degrees. In other embodiments, the lead in angle of tapered profile 416 may be greater than 35 degrees or less than 15 degrees. In the illustrated embodiment, nonintegral raceway 382 has a conical or tapered inner edge 418 that mates with and corresponds to tapered profile 416 of external ridge 394. The axial length of tapered profile 416 of external ridge 394 may be between 1.5 and 3 times longer than tapered inner edge 418 of nonintegral raceway 382 such as about 2 times longer than tapered inner edge 418 of nonintegral raceway 382. In other embodiments, the axial length of tapered profile 416 may be greater than 3 times or less than 1.5 times longer than tapered inner edge 418 of nonintegral raceway 382.

Nonintegral raceway 382 may be formed from a different material than mast 388. For example, nonintegral raceway 382 may be formed from a hardened steel such as from a M50 alloy steel including M50 NiL alloy steel and mast 388 may be formed from a corrosion resistant material such as stainless steel or titanium. In the illustrated embodiment, nonintegral raceway 382 is a through-hardened raceway that provides a smooth, hard and durable outer surface against which roller bearings 420 may engage. In addition to mast bearing assembly 386a, top case 384 houses a thrust bearing assembly 386b that may carry the shear and thrust loads of propulsion assembly 380.

Using the illustrative embodiments, a nonintegral raceway of a sufficiently hardened material can be mounted to a stainless steel mast that has corrosion resistance properties without the use of superfluous fasteners or other parts, thereby reducing the weight and complexity of a propulsion assembly. Unlike propulsion assembly 216 in FIGS. 3C-3D, the internal ledge enhanced press fit joints between a nonintegral raceway and a mast do not require threads or threaded fasteners that create stress concentrations at or around the nonintegral raceway during operation. In addition, the internal ledges disclosed herein do not create stress rising features that may compromise the structural integrity of a propulsion assembly. In contrast to the integral raceway of FIGS. 3A-3B in which only a shallow surface portion of the mast is case hardened, the illustrative embodiments allow for a thicker nonintegral raceway to withstand the loads and stresses exerted by roller bearings. Also, unlike the integral raceway of FIGS. 3A-3B, the disclosed nonintegral raceways may be replaced independently of the mast if a nonintegral raceway becomes damaged.

Figure 7A:
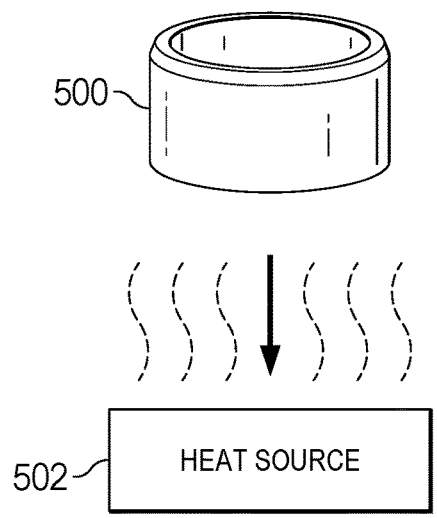
FIGS. 7A-7D are isometric views of various stages of assembling of a mast having an axially biased nonintegral raceway for a rotorcraft in accordance with embodiments of the present disclosure.
Figure 7B:
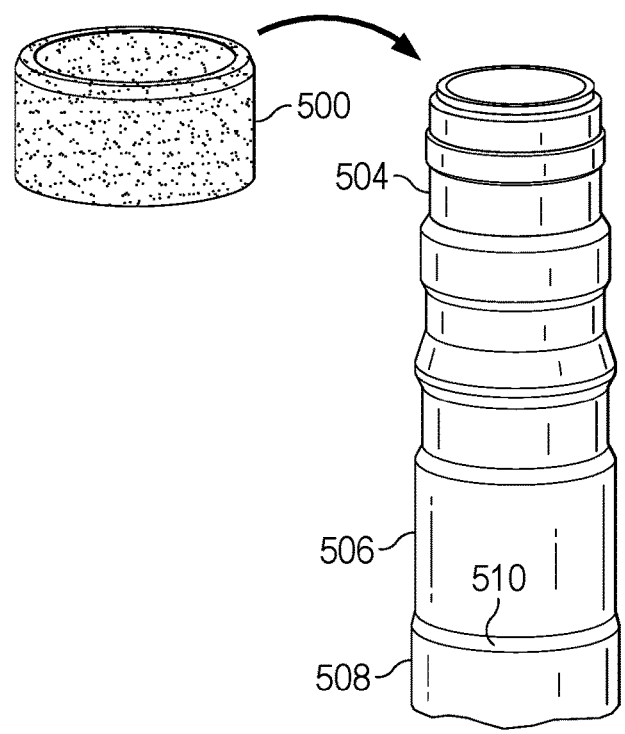
Figure 7C:
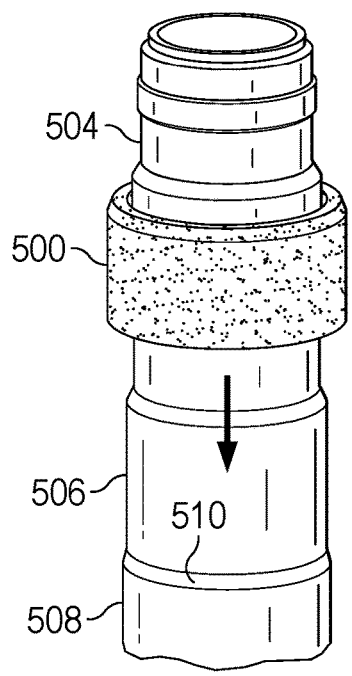
Figure 7D:
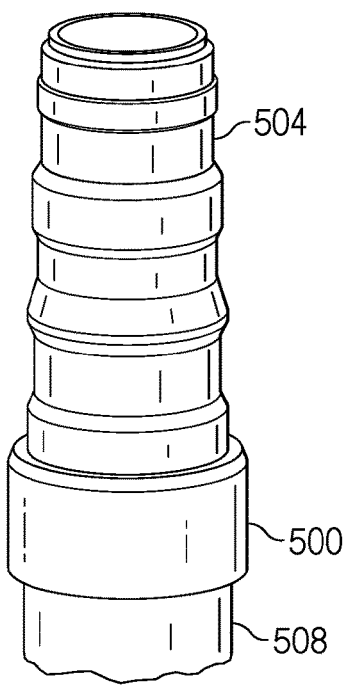

Referring to FIGS. 7A-7D in the drawings, a method for assembling a propulsion assembly of a rotorcraft is schematically illustrated. A nonintegral raceway 500, which may be representative of nonintegral raceways 302, 332, 382 discussed herein, is provided. Nonintegral raceway 500 has been form from a suitable material such as high-speed steel including having been previously case-hardened, through-hardened, induction-hardened, carburized or otherwise suitably hardened using a desired material hardening technique. In FIG. 7A, nonintegral raceway 500 is thermally expanded using a heat source 502. In FIG. 7B, a mast 504 which may be representative of masts 308, 338, 388 is provided. In the illustrated embodiment, mast 504 has been formed from a suitably corrosion resistant material such as stainless steel and has been machined to form an internal ledge (not visible), a raceway station 506 and an external ridge 508 having a tapered profile 510. Heated nonintegral raceway 500 may now be thermally fitted on mast 504 while mast 504 is kept at approximately room temperature or other temperature lower than heated nonintegral raceway 500. In FIG. 7C, heated nonintegral raceway 500 is being installed on mast 504 by moving heated nonintegral raceway 500 down mast 504 until heated nonintegral raceway 500 is received by raceway station 506. It is noted that heated nonintegral raceway 500 is moved onto raceway station 506 of mast 504 while heated nonintegral raceway 500 is thermally expanded. In FIG. 7D, nonintegral raceway 500 is allowed to cool, for example by air-cooling, to form a press fit joint between mast 504 and nonintegral raceway 500 at raceway station 506. In this manner, nonintegral raceway 500 may be thermally fitted onto mast 504.

Figure 8:
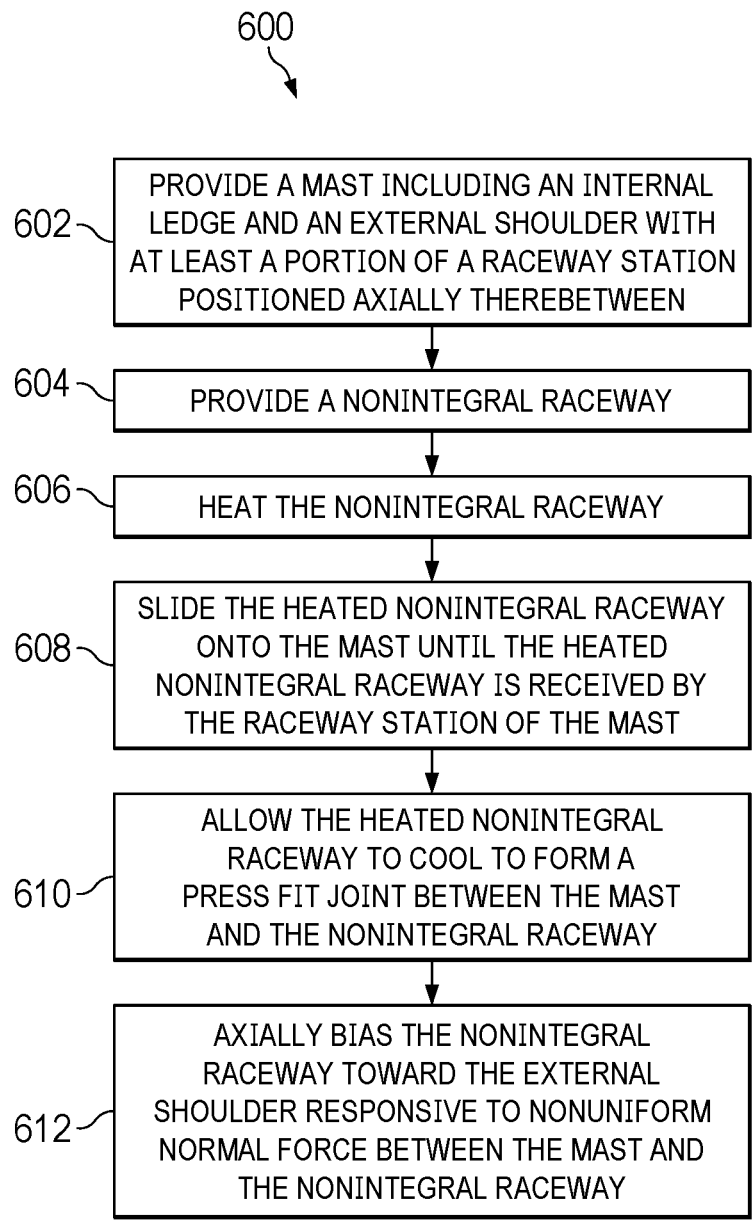
FIG. 8 is a flowchart of a method for assembling a mast having an axially biased nonintegral raceway for a rotorcraft in accordance with embodiments of the present disclosure.

Referring to FIG. 8 in the drawings, a method of securing a nonintegral raceway to a mast for a rotorcraft is presented in flowchart form and generally designate 600. Method 600 includes providing a mast having an internal ledge, a raceway station and an external ridge with at least a portion of the raceway station positioned axially between the internal ledge and the external ridge (step 602); providing a nonintegral raceway (step 604) that may be formed from a different material than the mast and may include a hardened outer surface; heating the nonintegral raceway (step 606); thermally fitting the heated nonintegral raceway onto the mast until the heated nonintegral raceway is received by the raceway station of the mast (step 608); allowing the heated nonintegral raceway to cool to form a press fit joint between the nonintegral raceway and the mast (step 610); and axially biasing the nonintegral raceway toward the external ridge responsive to a nonuniform normal force between the mast and the nonintegral raceway along the raceway station, thereby securing the nonintegral raceway at the raceway station (step 612).

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A propulsion assembly for a rotorcraft, the propulsion assembly comprising:
    a mast including an internal ledge, a raceway station and an external ridge, at least a portion of the raceway station positioned axially between the internal ledge and the external ridge;
    a nonintegral raceway receivable by the raceway station to form a press fit joint between the mast and the nonintegral raceway; and
    a mast bearing assembly including a plurality of bearings configured to engage an outer surface of the nonintegral raceway;
    wherein, the internal ledge is configured to generate a nonuniform normal force between the mast and the nonintegral raceway along the raceway station that axially biases the nonintegral raceway toward the external ridge, thereby securing the nonintegral raceway at the raceway station.

2. The propulsion assembly as recited in claim 1, wherein the internal ledge further comprises a circumferential internal ledge;
    wherein, the raceway station further comprises a circumferential raceway station; and
    wherein, the external ridge further comprises a circumferential external ridge.

3. The propulsion assembly as recited in claim 1, wherein the internal ledge has a maximum wall thickness that is between 1.5 and 3 times a wall thickness of the mast proximate the external ridge.

4. The propulsion assembly as recited in claim 1, wherein the internal ledge has a maximum wall thickness that is between 1.75 and 2.5 times a wall thickness of the mast proximate the external ridge.

5. The propulsion assembly as recited in claim 1, wherein the internal ledge has a maximum wall thickness that is 2 times a wall thickness of the mast proximate the external ridge.

6. The propulsion assembly as recited in claim 1, wherein the internal ledge has a proximal profile and a distal profile.

7. The propulsion assembly as recited in claim 6, wherein the proximal profile and the distal profile of the internal ledge are common profiles.

8. The propulsion assembly as recited in claim 6, wherein the proximal profile and the distal profile of the internal ledge are dissimilar profiles.

9. The propulsion assembly as recited in claim 6, wherein the proximal profile and the distal profile of the internal ledge are arcuate profiles.

10. The propulsion assembly as recited in claim 6, wherein the proximal profile is a tapered profile and the distal profile is an arcuate profile.

11. The propulsion assembly as recited in claim 1, wherein the external ridge has a tapered profile.

12. The propulsion assembly as recited in claim 11, wherein the tapered profile of the external ridge has an angle of between 20 degrees and 30 degrees.

13. The propulsion assembly as recited in claim 11, wherein the tapered profile of the external ridge has an angle of 25 degrees.

14. The propulsion assembly as recited in claim 11, wherein the nonintegral raceway has a tapered edge the mates with the tapered profile of the external ridge of the mast.

15. The propulsion assembly as recited in claim 1, wherein the nonintegral raceway is formed from a different material than the mast.

16. The propulsion assembly as recited in claim 1, wherein the nonintegral raceway further comprises a M50 alloy steel; and wherein, the mast further comprises a stainless steel.

17. The propulsion assembly as recited in claim 1, wherein the nonintegral raceway further comprises a material that is hardened; and wherein, the mast further comprises a material that is not hardened.

18. The propulsion assembly as recited in claim 1, wherein the nonintegral raceway is thermally fitted onto the raceway station.

19. A rotorcraft comprising:

a fuselage; and a propulsion assembly coupled to the fuselage, the propulsion assembly including:

a mast including an internal ledge, a raceway station and an external ridge, at least a portion of the raceway station positioned axially between the internal ledge and the external ridge;

a nonintegral raceway receivable by the raceway station to form a press fit joint between the mast and the nonintegral raceway; and a mast bearing assembly including a plurality of bearings configured to engage an outer surface of the nonintegral raceway;

wherein, the internal ledge is configured to generate a nonuniform normal force between the mast and the nonintegral raceway along the raceway station that axially biases the nonintegral raceway toward the external ridge, thereby securing the nonintegral raceway at the raceway station.

20. The rotorcraft as recited in claim 19 wherein, the rotorcraft is a tiltrotor aircraft.

\* \* \* \* \*